(12) United States Patent  
Lao

(10) Patent No.: US 10,830,436 B2  
(45) Date of Patent: Nov. 10, 2020

(54) COMBUSTOR HEAT SHIELD EDGE COOLING

(71) Applicant: PRATT & WHITNEY CANADA CORP., Longueuil (CA)

(72) Inventor: Si-Man Amy Lao, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 232 days.

(21) Appl. No.: 15/926,368

(22) Filed: Mar. 20, 2018

(65) Prior Publication Data

US 2019/0293289 A1    Sep. 26, 2019

(51) Int. Cl.
| | |
|---|---|
| *F23R 3/16* | (2006.01) |
| *F23R 3/00* | (2006.01) |
| *F23R 3/06* | (2006.01) |

(52) U.S. Cl.
CPC .............. *F23R 3/002* (2013.01); *F23R 3/06* (2013.01); *F23R 2900/03041* (2013.01); *F23R 2900/03042* (2013.01); *F23R 2900/03044* (2013.01); *F23R 2900/03045* (2013.01)

(58) Field of Classification Search
CPC .... F23R 3/002; F23R 3/06; F23R 3/16; F23R 2900/03041–03045
See application file for complete search history.

(56) References Cited

U.S. PATENT DOCUMENTS

| | | | |
|---|---|---|---|
| 4,446,693 A | 5/1984 | Pidcock et al. | |
| 7,886,541 B2 | 2/2011 | Woolford et al. | |
| 8,453,459 B2* | 6/2013 | Cameriano | F23R 3/283 |
| | | | 60/39.11 |
| 8,745,988 B2 | 6/2014 | Verhiel et al. | |
| 2002/0056277 A1* | 5/2002 | Parry | F23M 5/04 |
| | | | 60/752 |
| 2005/0022531 A1* | 2/2005 | Burd | F23R 3/002 |
| | | | 60/752 |
| 2014/0090402 A1* | 4/2014 | Erbas-Sen | F23R 3/04 |
| | | | 60/806 |
| 2014/0216042 A1* | 8/2014 | Hanson | F23R 3/06 |
| | | | 60/754 |
| 2015/0135720 A1 | 5/2015 | Papple et al. | |

* cited by examiner

*Primary Examiner* — Steven M Sutherland  
(74) *Attorney, Agent, or Firm* — Norton Rose Fulbright Canada LLP

(57) ABSTRACT

A combustor heat shield comprises a panel body having a front surface and a back surface. The back surface has rail-less edges and a turbulator band extending inwardly from the rail-less edges. The band includes a plurality of turbulators defining tortuous cooling paths up to the rail-less edges. Effusion holes are distributed over the central area.

17 Claims, 6 Drawing Sheets

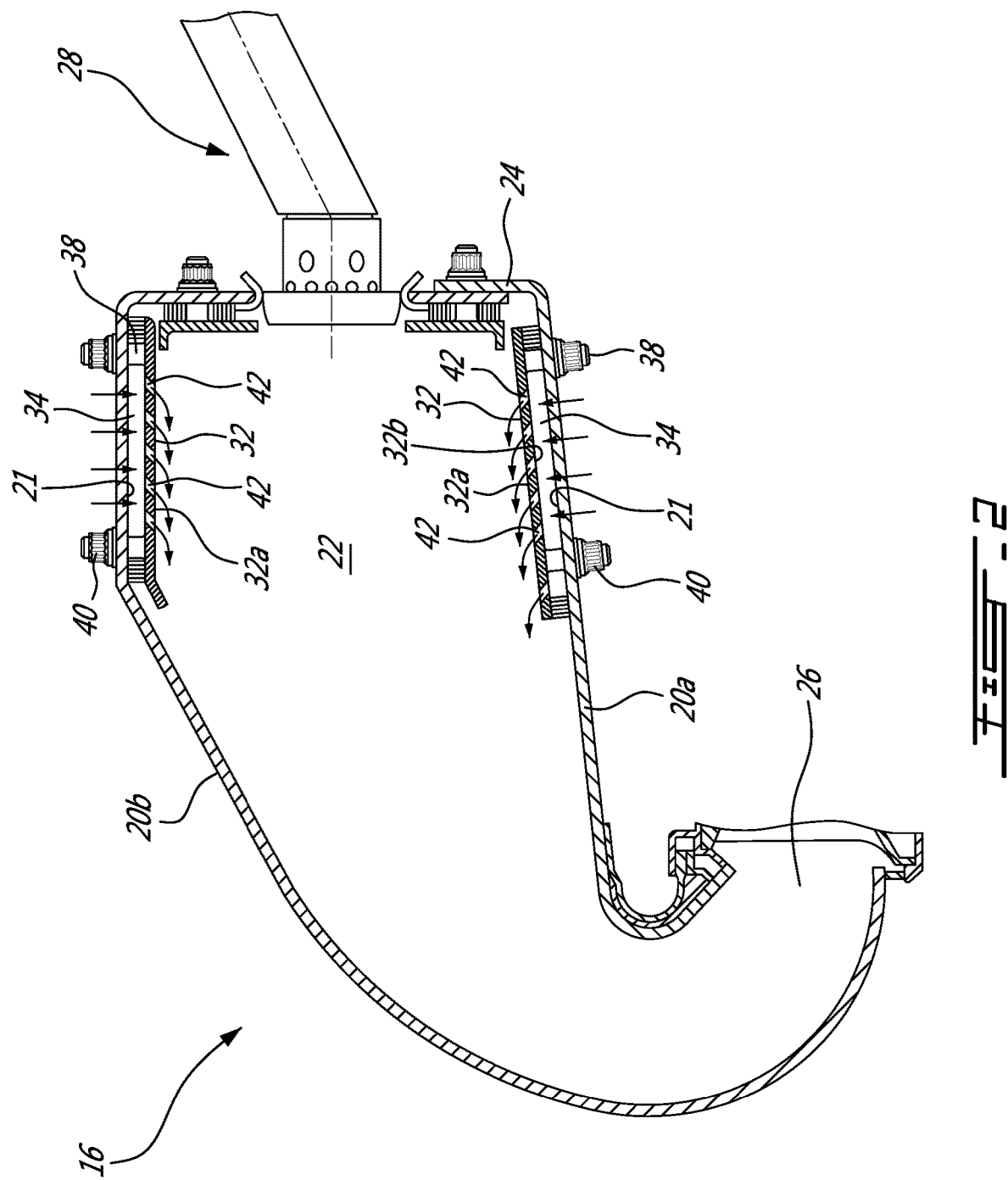

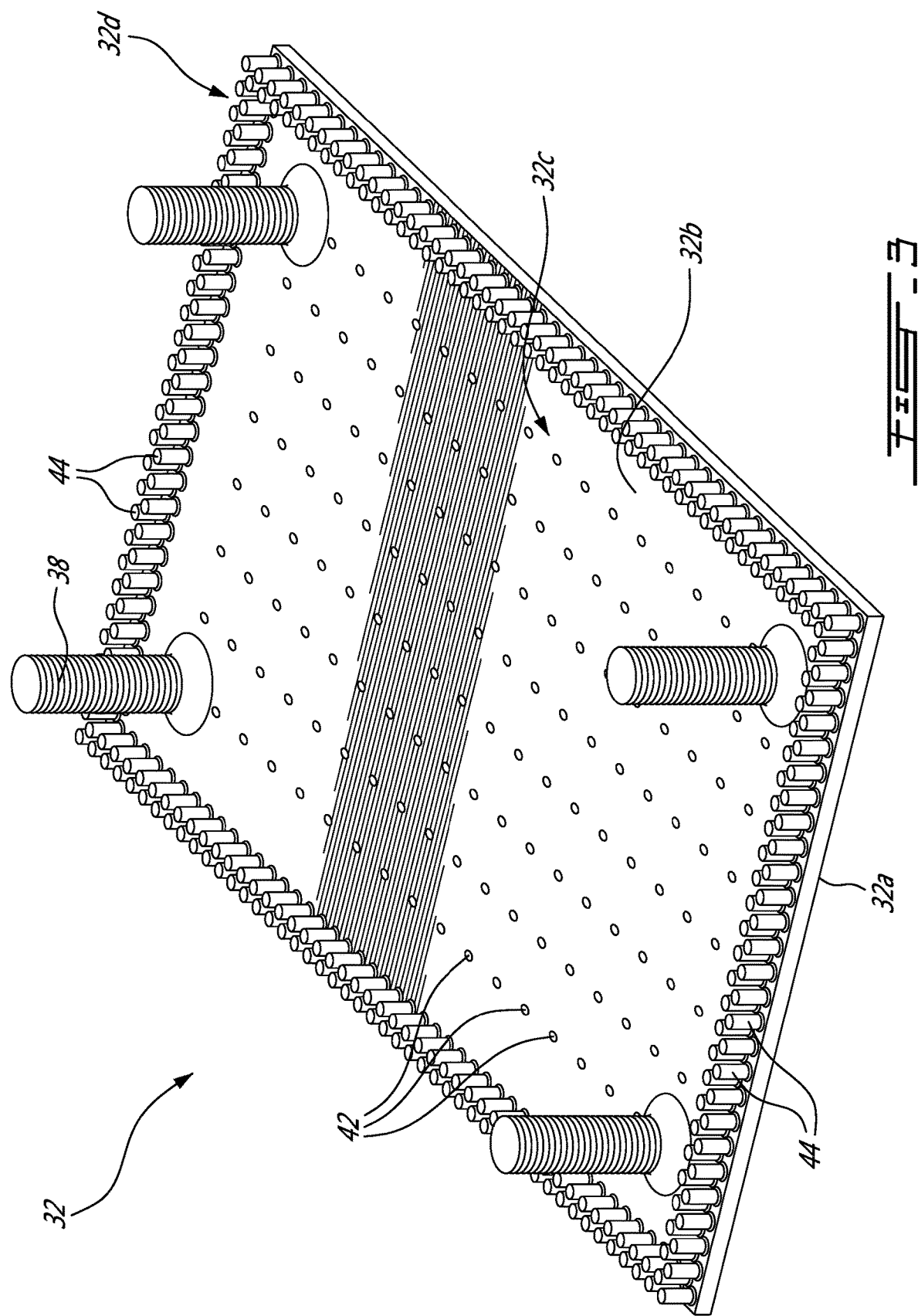

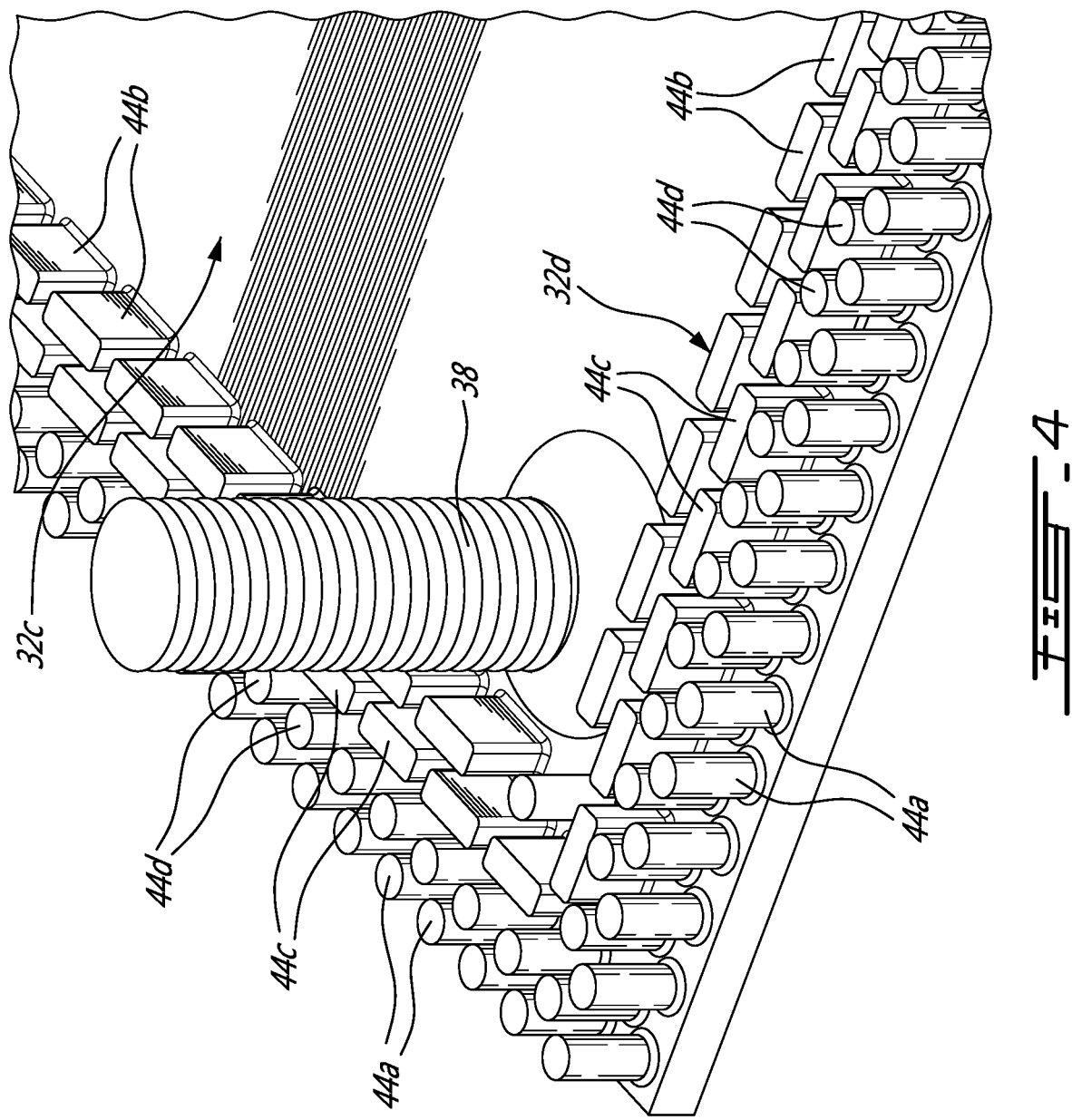

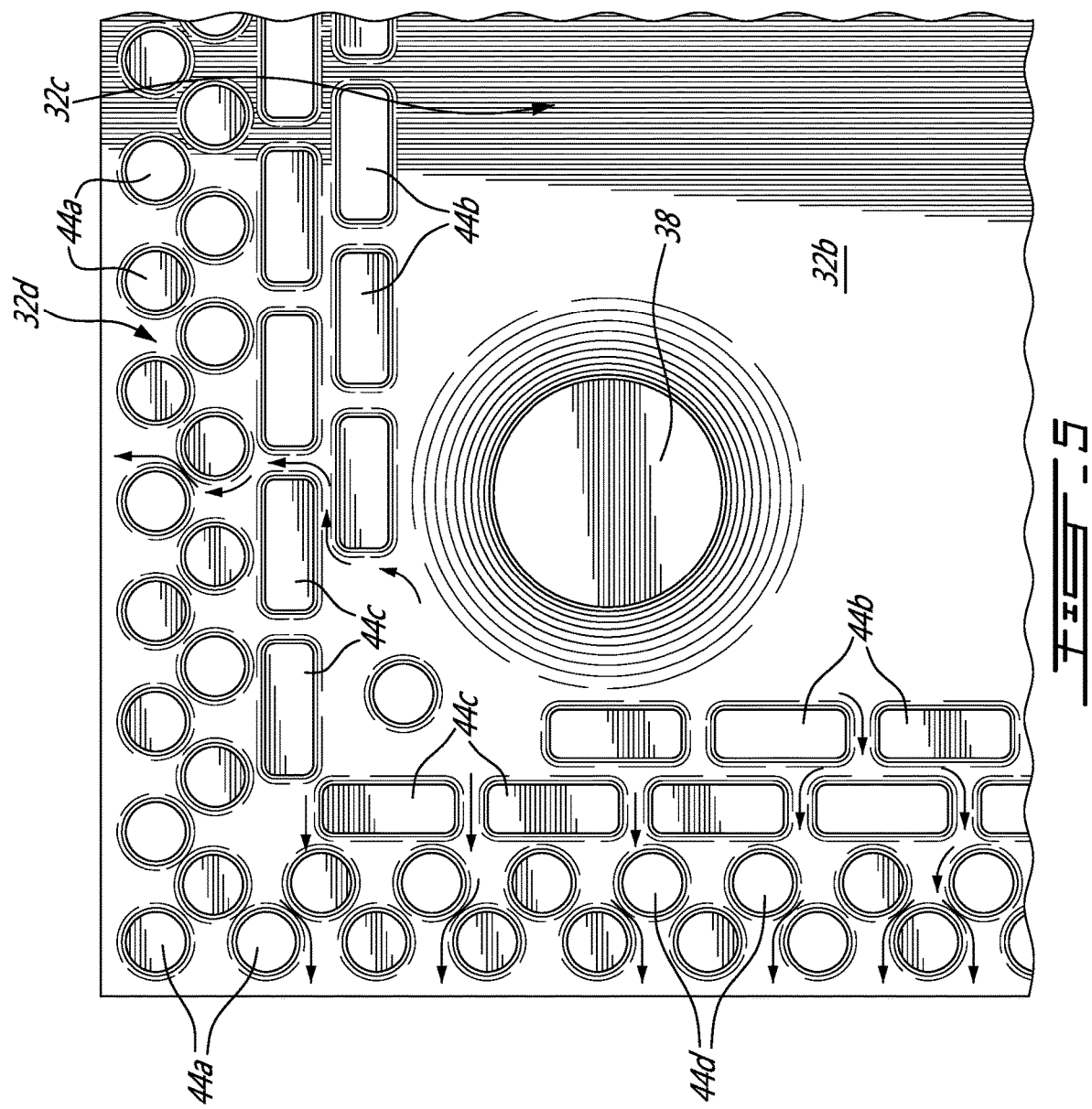

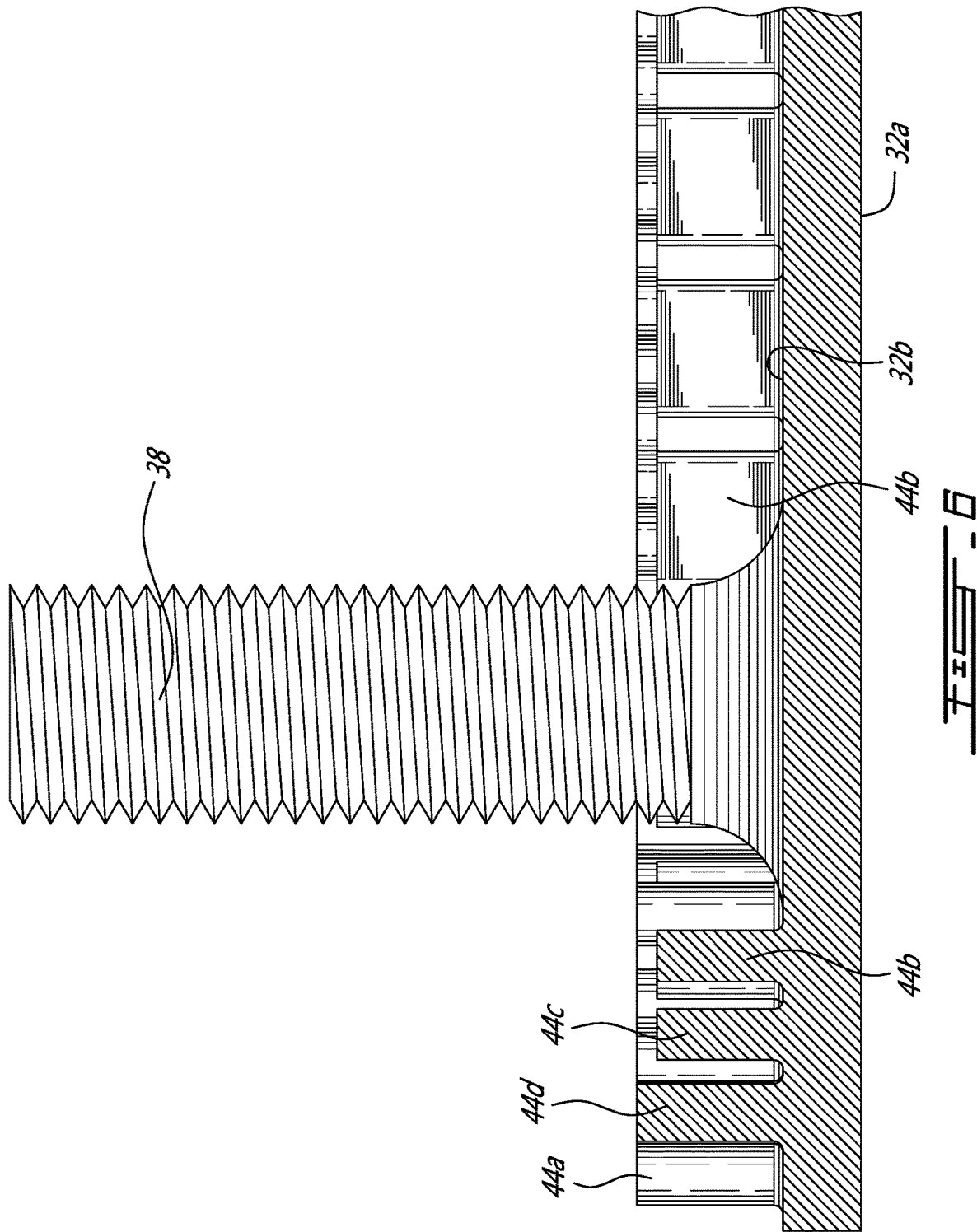

COMBUSTOR HEAT SHIELD EDGE COOLING

TECHNICAL FIELD

The application relates generally to gas turbine engines and, more particularly, to the cooling of the rim area of combustor heat shield panels.

BACKGROUND OF THE ART

Gas turbine combustors are the subject of continual improvement, to provide better cooling, better mixing, better fuel efficiency, better performance, etc. at a lower cost. For example, heat shields are known to provide better protection to the combustor, but heat shields also require cooling. The amount of cooling air available for cooling the heat shields must be minimized to improve the combustion efficiency and to reduce smoke, unburned hydrocarbon and CO/NOx emission. Efficient use of cooling air is, thus, desirable. For instance, excessive or uncontrolled leakage of cooling air over the edges of adjacent heat shield panels represents a loss of energy and lower engine efficiency.

It is thus desirable to control leakage of cooling air at the edges of heat shields and make efficient use thereof to reduce unnecessary consumption of cooling air.

SUMMARY

In one aspect, there is provided a combustor heat shield for a gas turbine engine, the combustor heat shield comprising: a panel body having a front surface and a back surface, the back surface having a rail-less contour and a perimeter band extending inwardly from the rail-less contour and circumscribing a central area; turbulators distributed over the perimeter band about the central area, the turbulators defining tortuous cooling paths across the perimeter band up to the rail-less contour; and effusion holes distributed over the central area.

In another aspect, there is provided a combustor heat shield for a gas turbine engine, the combustor heat shield comprising: a panel body having a front surface, a back surface and a central area with effusion holes, the back surface having rail-less peripheral edges and a peripheral turbulator band extending inwardly from the rail-less peripheral edges, the peripheral turbulator band including a plurality of turbulators extending from the back face and arranged to define between them tortuous paths up to the rail-less peripheral edges.

In another aspect, there is provided a combustor of a gas turbine engine, the combustor comprising: a combustor liner defining a combustion chamber, a heat shield secured to the combustor liner inside the combustion chamber, the heat shield comprising a panel body having a front surface oriented internally relative to the combustion chamber and a back surface oriented toward the combustor liner, the back surface having a perimeter band extending inwardly from a rail-less contour of the panel and circumscribing a central area, the perimeter band including staggered rows of turbulators defining tortuous cooling paths across the perimeter band all the way to the rail-less contour, and effusion holes distributed over the central area inwardly of the perimeter band.

In a further aspect, there is provided a method for cooling a heat shield panel of a combustor of a gas turbine engine, the heat shield panel having a back surface having a perimeter delimited by peripheral edges, the method comprising: generating turbulences in a cooling airflow escaping from the peripheral edges of the heat shield panel by forcing the cooling airflow to flow along tortuous paths all the way to the peripheral edges of the heat shield panel.

DESCRIPTION OF THE DRAWINGS

Reference is now made to the accompanying figures in which:

FIG. 2 is a schematic cross-section view of a combustor of the gas turbine engine;

FIG. 3 is a schematic isometric view of a heat shield of the combustor;

FIG. 4 is an enlarged isometric view of a corner of the heat shield;

FIG. 5 is a plan view of a back corner of the heat shield; and

FIG. 6 is an enlarged cross-section view of a corner area of the heat shield.

DETAILED DESCRIPTION

Figure 1:
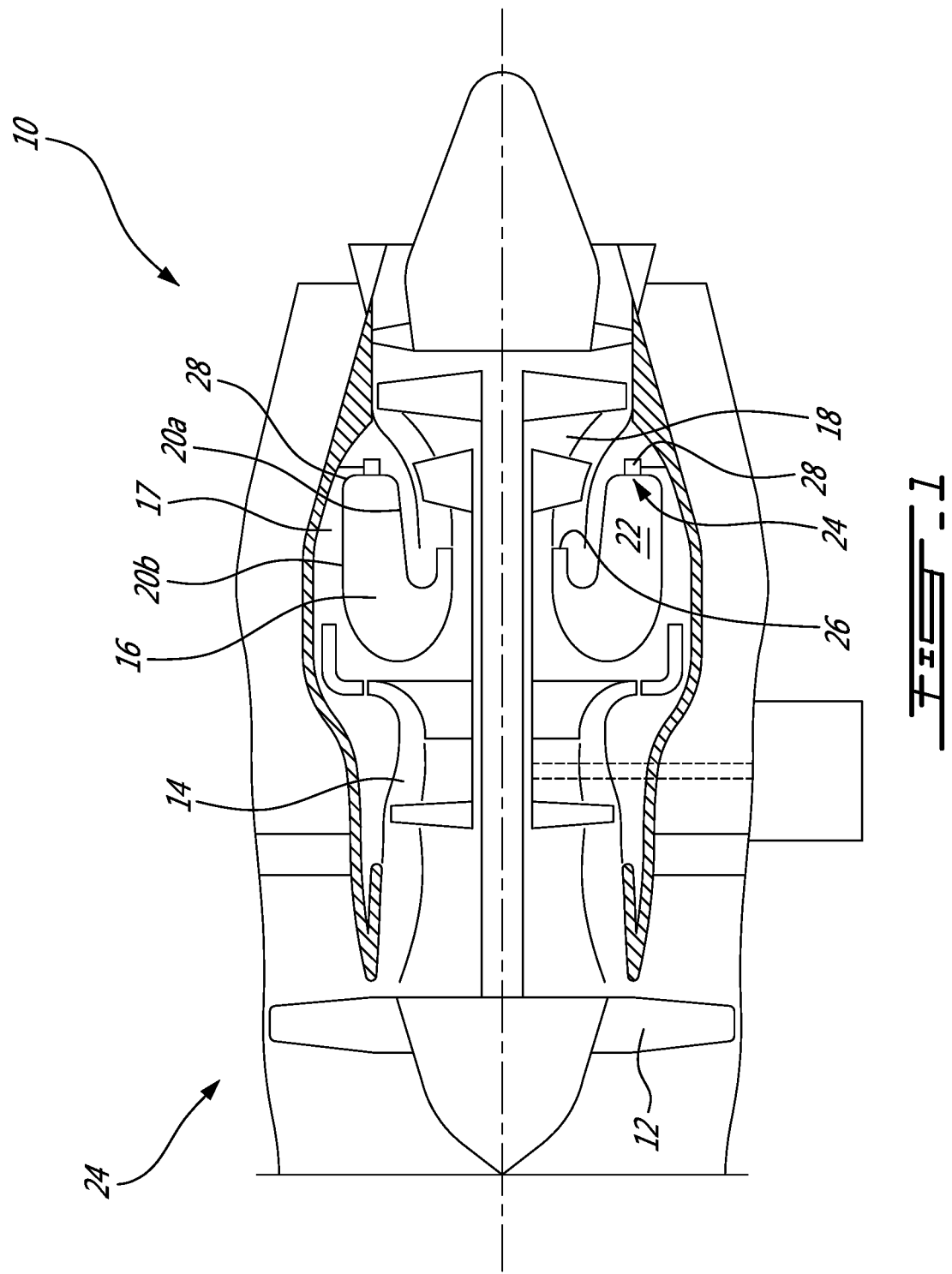
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. As shown in FIG. 1, the combustor 16 may, for instance, comprise a reverse flow annular combustor shell including a radially inner liner 20a and a radially outer liner 20b, extending from a dome or bulkhead 24 and defining therewith a combustion chamber 22. The combustor 16 further has an exit portion 26 for communicating combustion gases with the turbine section 18. Circumferentially distributed fuel nozzles 28 extend through the dome 24 of the combustor 16 to deliver a fuel-air mixture to the combustion chamber 22.

As can be appreciated from FIG. 2, the inner surface 21 of the combustor liners 20a, 20b is lined with heat shields 32 that protect the combustor liners from direct exposure to hot combustion gases. The heat shields 32 each have a panel body having a front surface 32a and a back surface 32b. The front surface 32a is relatively smooth and continuous and is oriented internally relative to the combustion chamber 22 (i.e. it faces the combustion zone). The back surface 32b faces the inner surface 21 of the combustor liners 20a, 20b. More particularly, the heat shield panels are mounted to the combustor liners 20a, 20b with the back surface 32b of the heat shield panels in closed facing, spaced-apart, relationship with the inner surface 21 of the combustor liners 20a, 20b. To that end, each heat shield 32 may be provided on the back surface 32b thereof with a number of studs 38 for extending through corresponding mounting holes defined in the combustor liners 20a, 20b. Nuts 40 are screwed or threadably engaged on a threaded distal end portion of each stud 38 outwardly of the combustor shell to securely hold the heat shields 32 in position on the inner surface 21 of the combustor liners 20a, 20b. The studs 38 may be integrally cast, metal injection molded (MIM) or otherwise suitably formed with the heat shield panel. As shown in FIG. 3, one stud may be provided in each corner region of the heat shield panel. However, it is understood that studs may be provided in various locations (e.g. corners, mid-panel, mid-edge) as per different heat shield sizes.

Referring back to FIG. 2, it can be appreciated that the back surface 32b of the heat shield panels and the inner surface 21 of the combustor liners 20a, 20b define an air gap 34 for receiving cooling air to cool down the heat shields 32. Cooling holes, such as impingement holes (not shown), are defined in the combustor liners 20a, 20b for directing air from the plenum 17 into the air gap 34. As will be seen hereinafter, the flow of air in air gap 34 (i.e. the flow on the back side of the heat shield panels) is controlled to effectively cool the various regions, including the rim region, of the heat shield panels.

FIG. 3 illustrates one example of a heat shield panel 32. The back surface 32b of the exemplary heat shield panel 32 comprises two distinct zones or areas: 1) a central area 32c and 2) a perimeter band 32d circumscribing the central area 32c. Effusion holes 42 are distributed over the central area 32c. The effusion holes 42 extend through the heat shield panel 32 from the back surface 32b to the front surface 32a. As shown in FIG. 2, the effusion holes 42 can be angled and configured to promote the formation of a cooling film on the front surface 32a of the heat shields. Referring back to FIG. 3, it can be appreciated that the posts 38 extend from the corners of the central area 32a. That is the corner posts 38 are disposed inwardly from the perimeter band 32d.

Unlike, conventional heat shield panels, the back surface 32b of the illustrated exemplary heat shield panel 32 has a rail-less contour (i.e. it does not include side-rails or elongated sealing walls along the peripheral edges of the panel for sealing engagement with the combustor liners 20a, 20b). Rather, the flow of cooling air escaping from the sides of the heat shield panel 32 is controlled by turbulators 44 arranged in arrays of multiple turbulators distributed over the perimeter band 32d on all sides of the heat shield panel 32. More particularly, the turbulators 44 forming the perimeter band 32d are configured to act as high delta pressure (ΔP) cooling features around the rim of the heat shield panel 32, replacing side-rails, to generate additional heat removal from the escaping air. As schematically depicted in FIG. 3, staggered rows of turbulators 44 can be used to generally match (or throttle) the ΔP across the rails/walls that they replace such that the overall aerodynamic performance is not affected. That is the turbulators 44 can be configured and arranged to create a desired pressure drop to control and restrict the amount of cooling air escaping from the sides of the heat shield panel 32 just as a conventional sealing rail would do. But in addition of controlling the amount of air leaking from the heat shield sides, the turbulators 44 promote heat transfer across the perimeter band 32d up to the rail-less contour of the heat shield panel 32, thereby providing for a further utilization of the leakage air that is normally lost by the heat shield side-rails. Also the use of turbulators 44 instead of effusion holes to cool the rim region (the perimeter band 32d) of the heat shield panel 32 is advantageous in that the heat transfer mechanism associated to the turbulators is less impacted by local aerodynamics. Indeed, the effusion holes are less effective in the peripheral zone of the panels due to local eddies generated by the gaps between adjacent heat shield panels. Accordingly, improved cooling efficiency may be achieved by reducing the need to provide effusion holes around the heat shield rims. As such, the perimeter band 32d can be free from effusion holes. The perimeter band of turbulators 44 also improve part robustness by maintaining cooling function and partial heat shield cooling air ΔP in the event of heat shield edge oxidation.

As shown in FIGS. 4-6, the turbulators 44 can be provided in the form of staggered arrays of projections comprising rows of regularly spaced-apart projections, each row offset from the adjacent rows such as to define tortuous paths (see flow arrows in FIG. 5) across the perimeter band 32d all the way to the rail-less contour or edge of the heat shield panel 32 (the outermost row of projections still promote turbulence). Such an arrangement of staggered turbulators 44 force the air to navigate through various turns as it flows across the perimeter band 32d toward the border or edge of the heat shield panel 32. This promotes turbulence in the cooling air escaping from the rail-less contour of the heat shield panels and, thus, provides for enhanced heat transfer directly at the edges of the heat shield panel 32.

As can be further appreciated from FIGS. 4 to 6, the turbulators 44 can adopt various forms. For instance, the turbulators 44 can include pin, pin fins, pedestals, ribs, flow restrictor walls with holes etc. Also, the turbulators can have various cross-sectional shapes. For instance, cylindrical turbulators or rectangular turbulators could be provided. Also the turbulators may have different heights. As a further example, the turbulators could comprise full height pin fins (pin fins extending completely across air gap 34 in FIG. 2) and/or partial height pin fins. The turbulators 44 of a given row can be identical or different. A person skilled in the art will understand that various combinations of turbulators shapes and dimensions are possible to achieve the desired pressure drop (flow metering function) and heat transfer augmentation. Therefore, it is understood that the illustrated turbulence inducing projection arrangement in perimeter band 32d is provided for illustration purposes only.

The illustrated perimeter band 32d comprises a plurality of rows (4 in the illustrated example) of turbulators 44 or edge cooling features, the rows being parallel to the sides of the heat shield panel 32. The plurality of rows includes an outermost row of regularly spaced-apart full height pin fins 44a disposed at the rail-less contour of the heat shield panel 32. According to the illustrated embodiment, the pin fins 44a of the outermost row are cylindrical. The plurality of rows of turbulators further comprises an innermost row of regularly spaced-apart partial height ribs 44b at the inner side of the perimeter band 32d. According to the illustrated example, the ribs 44b have a rectangular cross-section. The plurality of rows of turbulators further comprises two intermediate rows of turbulators between the innermost and the outermost rows. The first intermediate row of turbulators downstream of the innermost row of turbulators comprises regularly spaced-apart partial height ribs 44c. The ribs 44c of first intermediate row of turbulators are staggered relative to the ribs 44b of the innermost row of turbulators to force the incoming cooling air to turn as it flows through the first two rows of turbulators. The second intermediate row of turbulators is disposed immediately downstream of the first intermediate row of turbulators relative to the incoming flow of cooling air. The turbulators of the second intermediate row of turbulators are staggered relative to the ribs 44c of the first intermediate row and to the pin fins 44a of the outermost row of turbulators. The turbulators of the second intermediate row of turbulators can be provided in the form of regularly spaced-apart full height cylindrical pin fins 44d. In the illustrated example, the pin fins 44d of the second intermediate row of turbulators are identical to the pin fins 44a of the outermost row of turbulators.

The four rows of turbulators 44 cooperate to restrict air leakage from the sides of the heat shield panels 32. In one aspect, the four rows of turbulators 44 offer a greater resistance to airflow than the effusion holes 42 in the central area 32c. As such, a major portion of the air directed into the air gap 34 between the combustor liners 20a, 20b and the heat shield panels 32 flows through the effusion holes 42 to form a film of cooling air on the hot side of the heat shield (i.e. over the front surface 32a). The turbulators 44 are configured to define a first ΔP in the airflow across the peripheral band 32d. The effusion holes 42 in turns define a second ΔP between the back surface 32b and the front surface 32a of the heat shield panels 32. The first ΔP of the turbulators 44 is greater than the second ΔP of the effusion holes 42. As such, a majority of the air directed into air gap 34 flows through the effusion holes 42 rather than across the perimeter band 32d of turbulators 44. By adjusting the relative ΔP between the effusion holes 42 of the central area 32c and the turbulators 44 of the perimeter band 32d, the amount of air escaping from the sides of the heat shield panels 32 can be controlled. In addition of being used to cool down the rim area of the heat shield panels 32, the metered flow of air escaping from the side of the heat shield panels 32 is used to help in purging away hot air between adjacent heat shield panels 32.

Embodiments disclosed herein include:

A—A combustor heat shield for a gas turbine engine, the combustor heat shield comprising: a panel body having a front surface and a back surface, the back surface having a rail-less contour and a perimeter band extending inwardly from the rail-less contour and circumscribing a central area; turbulators distributed over the perimeter band about the central area, the turbulators defining tortuous cooling paths across the perimeter band up to the rail-less contour; and effusion holes distributed over the central area.

B— A method for cooling a heat shield panel of a combustor of a gas turbine engine, the heat shield panel having a back surface having a perimeter delimited by peripheral edges, the method comprising: generating turbulences in a cooling airflow escaping from the peripheral edges of the heat shield panel by forcing the cooling airflow to flow along tortuous paths all the way to the peripheral edges of the heat shield panel.

C— A combustor of a gas turbine engine, the combustor comprising: a combustor liner defining a combustion chamber, a heat shield secured to the combustor liner inside the combustion chamber, the heat shield comprising a panel body having a front surface oriented internally relative to the combustion chamber and a back surface oriented toward the combustor liner, the back surface having a perimeter band extending inwardly from a rail-less contour of the panel and circumscribing a central area, the perimeter band including staggered rows of turbulators defining tortuous cooling paths across the perimeter band all the way to the rail-less contour, and effusion holes distributed over the central area inwardly of the perimeter band.

D—A combustor heat shield for a gas turbine engine, the combustor heat shield comprising: a panel body having a front surface, a back surface and a central area with effusion holes, the back surface having rail-less peripheral edges and a peripheral turbulator band extending inwardly from the rail-less peripheral edges, the peripheral turbulator band including a plurality of turbulators extending from the back face and arranged to define between them tortuous paths up to the rail-less peripheral edges.

Each of embodiments A-D may have one or more of the following additional elements in any combination:

1—The turbulators may comprise an outer row of turbulators at the rail-less contour, the turbulators of the outer row of turbulators being distributed along a full extent of the rail-less contour.

2—The turbulators may further comprise at least one additional row of turbulators disposed inboard of the outer row of turbulators, the turbulators of the at least one additional row of turbulators being staggered relative to the turbulators of the outer row of turbulators.

3—The turbulators may be configured to offer a greater resistance to flow than the effusion holes.

4—The turbulators may define a first ΔP across the peripheral band, the effusion holes defining a second ΔP between the back surface and the front surface of the panel body, and wherein the first ΔP is greater than the second ΔP.

5—At least some of the turbulators of the outer row of turbulators may be taller than at least some of the turbulators of the at least one additional row of turbulators.

6—Connection posts may extend from the central area of the back surface inwardly of the turbulators in the peripheral band.

7—The turbulators in the perimeter band may be distributed along a full perimeter of the back surface along all sides thereof.

8—At least some of the turbulators of the outer row of turbulators may have a different cross-sectional shape than that of at least some of the turbulators of the at least one additional row of turbulators.

The above description is meant to be exemplary only, and one skilled in the art will recognize that changes may be made to the embodiments described without departing from the scope of the invention disclosed. For example, while the principles of the present invention have been described in the context of combustor liner heat shields, it is understood that similar principles could be applied to combustor dome heat shields. Still other modifications which fall within the scope of the present invention will be apparent to those skilled in the art, in light of a review of this disclosure, and such modifications are intended to fall within the appended claims.

The invention claimed is:

1. A combustor heat shield for a combustor of a gas turbine engine, the combustor having a combustor liner, the combustor heat shield comprising: a panel body having a front surface, a back surface and a central area with effusion holes, the back surface having rail-less peripheral edges and a peripheral turbulator band extending inwardly from the rail-less peripheral edges, the peripheral turbulator band circumscribing the central area, the peripheral turbulator band including a plurality of turbulators extending from the back face and arranged to define between them tortuous paths up to the rail-less peripheral edges, wherein the peripheral turbulator band comprises an outer row of turbulators, and wherein at least some of the turbulators of the outer row of turbulators are configured to extend into contact with an inner surface of the combustor liner.

2. The combustor heat shield defined in claim 1, wherein the peripheral turbulator band further comprises at least one additional row of turbulators disposed inboard of the outer row of turbulators, the turbulators of the at least one additional row of turbulators being staggered relative to the turbulators of the outer row of turbulators.

3. The combustor heat shield defined in claim 2, wherein at least some of the turbulators of the outer row of turbulators are taller than at least some of the turbulators of the at least one additional row of turbulators.

4. The combustor heat shield defined in claim 2, wherein at least some of the turbulators of the outer row of turbulators have a different cross-sectional shape than that of at least some of the turbulators of the at least one additional row of turbulators.

5. The combustor heat shield defined in claim 1, wherein the peripheral turbulator band offers a greater resistance to flow than the effusion holes.

6. The combustor heat shield defined in claim 1, wherein the plurality of turbulators provides a first ΔP across the peripheral turbulator band, the effusion holes defining a second ΔP between the back surface and the front surface of the panel body, and wherein the first ΔP is greater than the second ΔP.

7. The combustor heat shield defined in claim 1, wherein connection posts extend from the central area of the back surface inwardly of the peripheral turbulator band.

8. The combustor heat shield defined in claim 1, wherein the turbulators in the peripheral turbulator band are distributed along a full perimeter of the back surface along all sides thereof.

9. A combustor of a gas turbine engine, the combustor comprising: a combustor liner defining a combustion chamber, a heat shield secured to the combustor liner inside the combustion chamber, the heat shield comprising a panel body having a front surface oriented internally relative to the combustion chamber and a back surface oriented toward the combustor liner, the back surface having a perimeter band extending inwardly from a rail-less contour of the panel and circumscribing a central area, the perimeter band including staggered rows of turbulators defining tortuous paths across the perimeter band all the way to the rail-less contour, and effusion holes distributed over the central area inwardly of the perimeter band, wherein the staggered rows of turbulators comprises an outer row of turbulators at the rail-less contour, and wherein at least some of the turbulators of the outer row of turbulators extend into contact with an inner surface of the combustor liner.

10. The combustor defined in claim 9, wherein the staggered rows of turbulators define a first ΔP across the peripheral band, the effusion holes defining a second ΔP between the back surface and the front surface of the panel body, and wherein the first ΔP is greater than the second ΔP.

11. The combustor defined in claim 9, wherein at least some of the turbulators of the outer row of turbulators are taller than at least some of the turbulators of the other rows of turbulators.

12. The combustor defined in claim 9, wherein connection posts extend from the central area of the back surface inwardly of the turbulators in the peripheral band.

13. The combustor defined in claim 9, wherein the turbulators in the perimeter band are distributed along a full perimeter of the back surface along all sides thereof.

14. The combustor defined in claim 9, wherein at least some of the turbulators of the outer row of turbulators have a different cross-sectional shape than that of at least some of the turbulators of the other rows of turbulators.

15. A method for cooling a heat shield panel of a combustor of a gas turbine engine, the heat shield panel having a back surface having a perimeter delimited by peripheral edges and facing an inner surface of a combustor liner, the method comprising: generating turbulences in a cooling airflow escaping from the peripheral edges of the heat shield panel by forcing the cooling airflow to flow along tortuous paths all the way to the peripheral edges of the heat shield panel, wherein generating turbulences comprises providing rows of turbulators in a perimeter band circumscribing a central area having effusion holes distributed thereover inwardly of the perimeter band, wherein the rows of turbulators include an outermost row of turbulators, the outermost row of turbulators provided at a rail-less contour of the heat shield panel, and wherein at least some of the turbulators of the outer row of turbulators extend into contact with the inner surface of the combustor liner.

16. The method defined in claim 15, comprising creating a pressure drop in the cooling airflow escaping across the perimeter band of the heat shield panel.

17. The method defined in claim 16, wherein the outermost row of turbulators creates turbulence up to the peripheral edges of the heat shield panel.

* * * * *